(12) United States Patent
Berry

(10) Patent No.: US 10,554,096 B2
(45) Date of Patent: Feb. 4, 2020

(54) SPHERICAL DEVICE

(71) Applicant: Lee Austin Berry, Los Angeles, CA (US)

(72) Inventor: Lee Austin Berry, Los Angeles, CA (US)

(73) Assignee: Lee Austin Berry, Los Angeles, CA (US)

( * ) Notice: Subject to any disclaimer, the term of this patent is extended or adjusted under 35 U.S.C. 154(b) by 187 days.

(21) Appl. No.: 15/624,641

(22) Filed: Jun. 15, 2017

(65) Prior Publication Data

US 2017/0366068 A1     Dec. 21, 2017

Related U.S. Application Data

(60) Provisional application No. 62/350,661, filed on Jun. 15, 2016.

(51) Int. Cl.
| | |
|---|---|
| *H02K 7/14* | (2006.01) |
| *H02K 5/167* | (2006.01) |
| *H04N 13/388* | (2018.01) |
| *H02K 99/00* | (2014.01) |

(52) U.S. Cl.
CPC ............... *H02K 7/14* (2013.01); *H02K 5/167* (2013.01); *H02K 99/20* (2016.11); *H04N 13/388* (2018.05); *H02K 2201/18* (2013.01); *H04N 2213/001* (2013.01)

(58) Field of Classification Search
CPC .......... H02K 7/14; H02K 99/20; H02K 5/167; H02K 2201/18; H04N 13/388; H04N 2213/001
See application file for complete search history.

(56) References Cited

U.S. PATENT DOCUMENTS

| | | | | |
|---|---|---|---|---|
| 3,586,973 | A * | 6/1971 | Lawton | G01R 29/0871 324/72 |
| 5,280,225 | A * | 1/1994 | Pine | B23Q 1/545 310/13 |
| 6,318,666 | B1 * | 11/2001 | Brotz | B64C 39/001 244/1 R |
| 6,351,049 | B1 * | 2/2002 | Chassoulier | F16C 11/06 310/90.5 |

(Continued)

*Primary Examiner* — Michael C Zarroli

(74) *Attorney, Agent, or Firm* — Sanjeev Kumar; Hunt Pennington Kumar & Dula, PLLC

(57) ABSTRACT

A sphere-on-sphere chassis system is disclosed. The sphere-on-sphere chassis system may include a first hollow sphere having a first diameter and a second hollow sphere positioned inside of the first sphere to form a channel therebetween. The second hollow sphere may have a second diameter. The second diameter is less than the first diameter. The sphere-on-sphere chassis system may further include a liquid filling at least a portion of the channel. The liquid may be a conductive solution. Each of the hollow spheres include a component layer with pockets for housing electromagnets, and may house wireless energy transmission devices such as resonant inductive chargers and resonant inductive receivers. The spherical device is designed so that electromagnets may be configured to emit positive and negative electromagnetic waves inwardly and outwardly with respect to the center of each sphere to create relative movement between the inner sphere and the outer sphere.

9 Claims, 11 Drawing Sheets

(56) References Cited

U.S. PATENT DOCUMENTS

| | | | | |
|---|---|---|---|---|
| 8,600,600 | B2* | 12/2013 | Jung | B60B 19/14 |
| | | | | 701/22 |
| 8,768,548 | B2* | 7/2014 | Thielman | B62D 57/00 |
| | | | | 701/124 |
| 9,178,393 | B2* | 11/2015 | Yano | H02K 41/031 |
| 9,475,592 | B2* | 10/2016 | Stagmer | B64G 1/28 |
| 9,853,528 | B2* | 12/2017 | Hollis, Jr. | H02K 41/025 |
| 2002/0053849 | A1* | 5/2002 | Corcoran | G05G 9/047 |
| | | | | 310/156.01 |
| 2004/0232790 | A1* | 11/2004 | Mendenhall | H02K 41/03 |
| | | | | 310/112 |

* cited by examiner

US 10,554,096 B2

SPHERICAL DEVICE

CROSS REFERENCE

This application claims the benefit of U.S. Provisional Application No. 62/350,661, filed Jun. 15, 2016. In this nonprovisional utility patent, some updates have been made from the earlier provisional version.

BACKGROUND OF THE INVENTION

Field of the Invention

This application relates to spherical technology. More particularly, this application relates to a sphere-on-sphere chassis system and it's housing for an electromagnetic drive system which may create independent movement between the spheres. This electromagnetic drive system may be referred to as a spherical electric motor or a sphere-on-sphere electric motor.

SUMMARY

In some embodiments, a sphere-on-sphere chassis system having sphere-on-sphere electric motor housing is provided. The sphere-on-sphere chassis system may include a first hollow sphere having a first diameter and a second hollow sphere positioned inside of the first sphere to form a channel therebetween. The second hollow sphere may have a second diameter, wherein the second diameter is less than the first diameter. The sphere-on-sphere chassis system may further include a liquid filling at least a portion of the channel, wherein the liquid is a clear, highly conductive solution. Alternatively, the channel may be filled by a gas or a vacuum may be created within the channel. The walls of the first hollow sphere and the second hollow sphere are generally strong, substantially transparent, and resistant to shattering. Both the first hollow sphere and the second hollow sphere are designed in a unique way in order to contain a series of electromagnets, and other components. The electromagnets may also be paired with resonant inductive chargers, and resonant inductive receivers, allowing electrical current to be transmitted through the walls of each sphere. The first hollow sphere and the second hollow sphere are configured to move independently of each other based on electromagnetic waves generated by the electromagnets. The spherical device is comprised of a unique layering system, and it is designed to be scalable, for various uses.

DETAILED DESCRIPTION OF CERTAIN INVENTIVE EMBODIMENTS

Figure 1A:
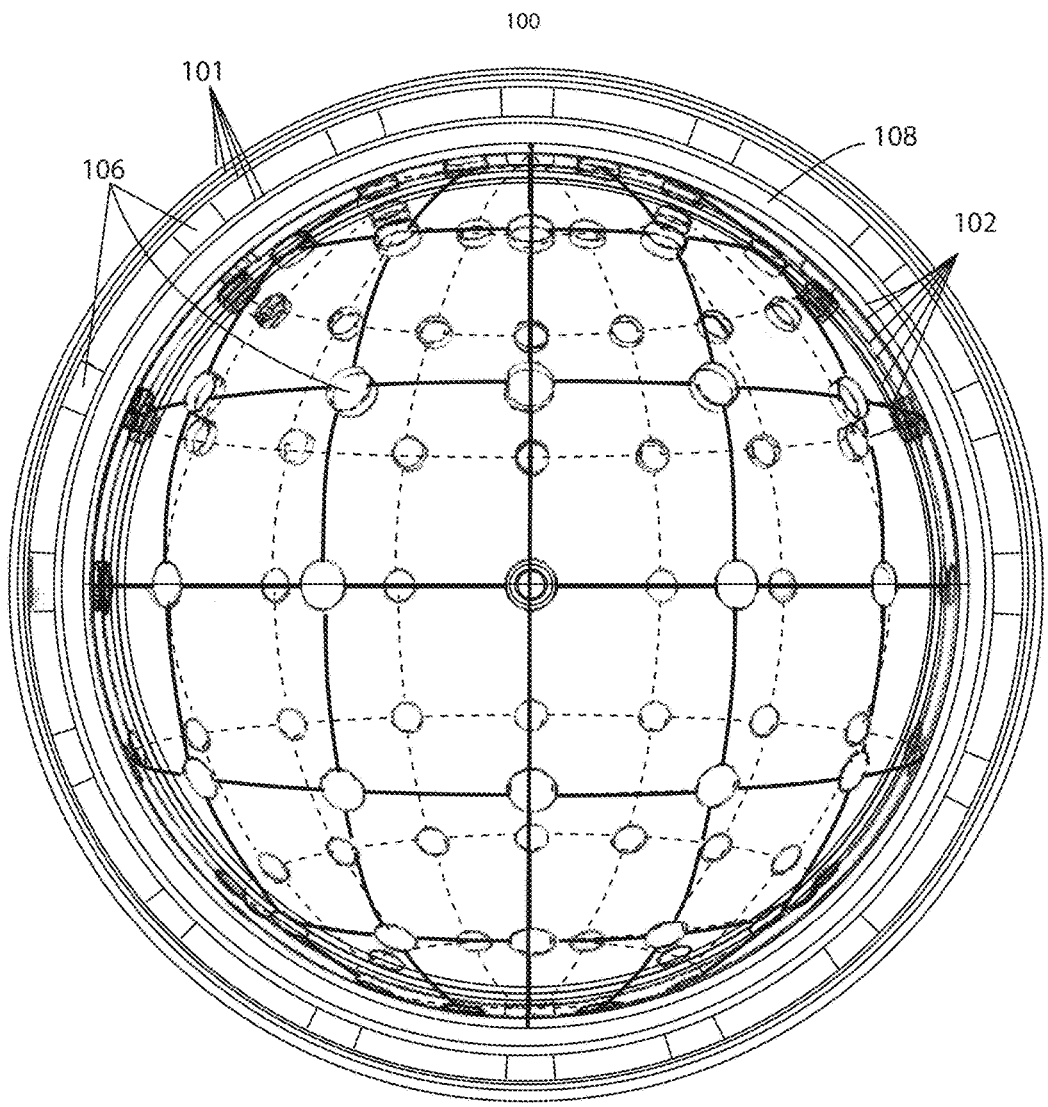
FIG. 1A is a view of an example of a sphere-on-sphere chassis system according to one or more embodiments, in which the outer sphere is shown as a cross section.

Inventive embodiments disclosed herein relate to the spherical device. The spherical device has a sphere-on-sphere chassis system. The sphere-on-sphere chassis system has as inner sphere and an outer sphere which are made of light-weight, high-strength, transparent materials. In some embodiments, the spheres are separated by a chamber that contains a liquid, which can allow buoyancy factors to take effect on the inner sphere within the outer sphere. In other embodiments the chamber may be occupied by a gas to maintain separation between the inner sphere and outer sphere. In other embodiments the chamber may be filled with both gas and liquid. In some embodiments the chamber may be used as a vacuum chamber, in which it contains no gas or liquids to separate the inner and outer spheres. In some embodiments, the inner and outer spheres incorporate specifically placed grids of pockets for housing components, which can be referred to as the electromagnetic grid system. The electromagnetic grid system may be used to create a drive system which can allow for independent, relative movement between the two spheres. This creation of independent relative movement allows for the sphere-on-sphere chassis system to be used in various ways. In some embodiments, the electromagnetic grid system and sphere-on-sphere chassis system may be used in conjunction with additional components to generate movement of the inner sphere, which may allow the inner sphere to act as a multi-directional treadmill. Additionally, in some such embodiments, the inner sphere has a layer designed for the placement of curved screens, which may be referred to as the screen housing layer. By inserting certain types of displays in the screen housing layer, along with the omnidirectional movement of the inner sphere, the inner sphere may be able to be used as a virtual reality environment. The electromagnetic grid system and sphere-on-sphere chassis system may also be used to create movement in the outer sphere while inhibiting much of the motion in the inner sphere. In these embodiments, the spherical device may be utilized as a transportation device. The unique pattern used for housing electromagnetic components is designed in such a way that there is always one pocket for such components that is directly across, through the center of the inner hollow sphere, from another pocket. Such a configuration, when combined with the proper components, can allow the outer sphere to drive, turn, pivot and rock independent of most of the motion in the inner sphere; it can also allow the inner sphere to drive, turn, pivot and rock independent of most of the motion of the outer sphere. Because of its spherical shape, and unique grid system, the outer sphere has a increased range of motion, allowing for improved maneuverability over existing transportation devices. Furthermore, in some embodiments, the outer sphere can also contain its own screen housing layer for the purpose of incorporating outward facing screen displays. The unique sphere on sphere chassis system, including the pockets, layers and screens, but not the channel, are intended to be as near to the same weight as possible of any other portion of the spherical device that is of equal size. This weight distribution is particularly important when measuring segments of the device that are directly across the center of the sphere; this is to say that one side should not be significantly heavier than it's opposite side. Lastly, the entire spherical device is made to be scalable. For example, on a smaller scale, elements of the spherical device may be used for a spherical electric tire. In such a use, the need for screens is no longer necessary, but many other aspects of the sphere-on-sphere chassis are still required, such as the component layer, the structural layers, the pattern of pockets being directly across from each other, the channel between the spheres and the relatively equal weight distribution.

Turning to FIG. 1A, an example of a sphere-on-sphere chassis system 100 according to one or more embodiments is provided. In this example, the sphere-on-sphere chassis system 100 spherical in shape having a external diameter of approximately 16 feet across from any point on the sphere through the direct center to its corresponding points on the opposite side of the sphere. As will be discussed below, the size in this example is sufficient for many different applications, including those involving human operators and/or passengers.

The sphere on sphere chassis system 100 includes an inner sphere 102. The inner sphere 102 is the sphere closest to the center of the sphere on sphere chassis system 100. The inner sphere 102 is generally comprised of various layers of material which will be discussed in more detail below in connection with FIG. 2. The sphere on sphere chassis system 100 also includes an outer sphere 104 of sufficient size so that the outer sphere 104 surrounds the inner sphere 102. As with the inner sphere 102, the outer sphere 104 may comprise various layers of materials. In general, both the inner sphere 102 and the outer sphere 104 are typically made of transparent and/or translucent materials which allow light to penetrate from outside the sphere to within the sphere, and vice versa. Thus, in an embodiment where the sphere on sphere chassis system 100 is used to carry a passenger and/or operator, the passenger and/or operator is able to see from within the inner sphere to outside the sphere in all directions due to the transparency and/or translucency of the inner and outer sphere, with the exception of the portions of the sphere that contain non transparent materials, such as the electromagnets and wires.

The sphere on sphere chassis system 100 also may include a plurality of pockets 106 positioned symmetrically around the sphere. In general, the pockets 106 may be used to house materials that are used to power and/or control the sphere on sphere chassis system 100. Pockets 106 may be formed in the inner sphere 102, with corresponding pockets 106 formed in the outer sphere 104. Typically, the pockets 106 are of a similar size and dimension. However, from the view shown in FIG. 1A, the appear to be of different sizes because some of the pockets 106 are formed on the far side of the sphere on sphere chassis system 100, while other pockets 106 are formed on the near side of the sphere and sphere chassis system 100.

In between the inner sphere 102 and the outer sphere 104 is a channel that may be filled with gas, a vacuum, or a liquid, and is referred to herein as a hydro-layer 108. In the embodiments shown herein, the hydro-layer 108 is a space surrounding the inner sphere 102 and inside of the outer sphere 104 which comprises conductive and/or semi conductive liquid. The liquid may be a liquid chemical solution, or it may be water, or it may be some other type of conductive and/or semi conductive liquid material. The hydro-layer 108 generally has two purposes. Its first purpose is to provide a barrier between the outer surface of the inner sphere 102, and the inner surface of the outer sphere 104. By maintaining the separation, the two spheres are able to move and rotate independently of one another. The second purpose for the hydro-layer 108 is to aid in conduction of electricity between the inner sphere 102 and the outer sphere 104, as will be discussed in more detail below.

Figure 1B:
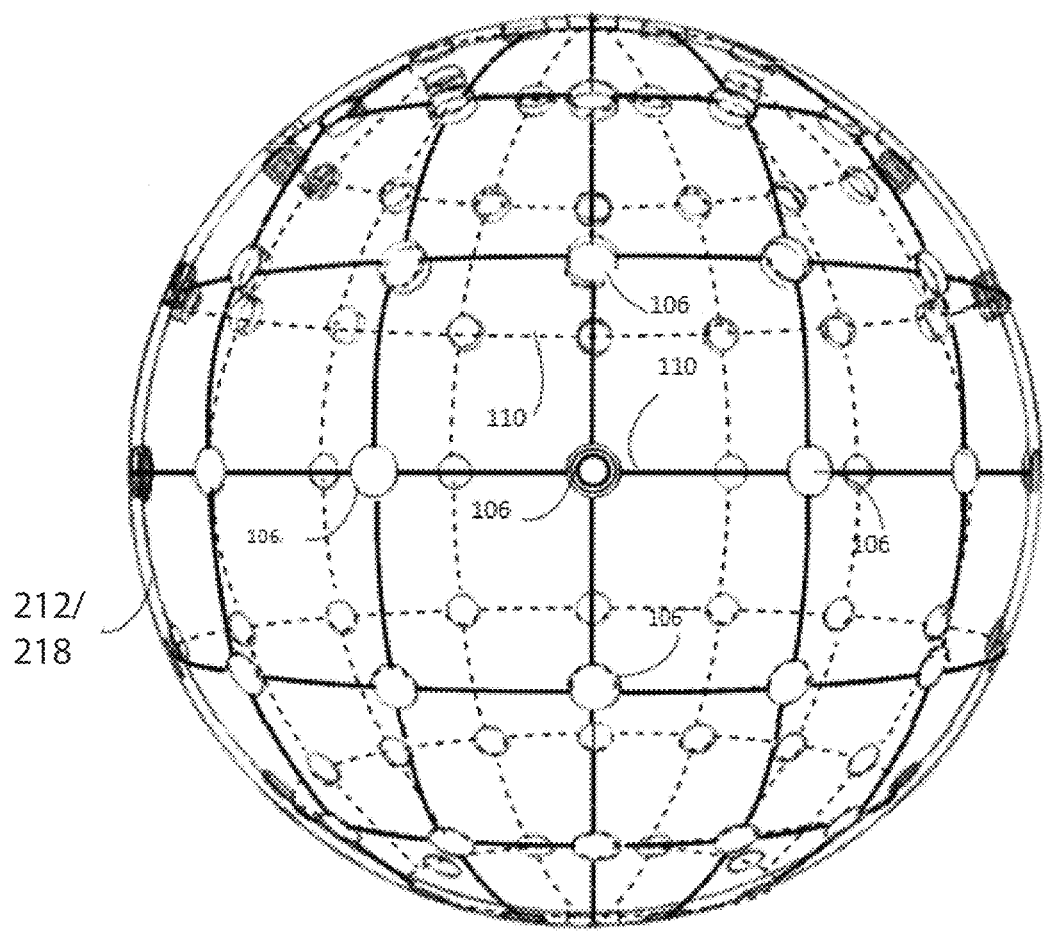
FIG. 1B is a view of a component layer of the sphere-on-sphere chassis system from FIG. 1A further showing electrical wiring configuration between electromagnetic components.

Turning now to FIG. 1B, a portion of the sphere-on-sphere chassis system 100 from FIG. 1A is provided here, but is now only showing an example of a component layer. FIG. 1B is also showing an electrical wiring channel configuration according to one or more embodiments, where each pocket 106 has multiple channels for wiring 110 that lead directly to the other nearby pockets. As shown, the pockets 106 are symmetrically positioned throughout the component layer of sphere-on-sphere chassis 100. While there are many important things to notice about the unique design of the pockets, one of the most important things to observe is that each pocket is directly across the center point of it's sphere from another pocket. While the sizing of the inner sphere 102 component layer will always be smaller than the size of the outer sphere 104 component layer, the pattern and symmetry remain the same. Another notable feature of FIG. 1B is that, due to the complexity of viewing the spherical design from any angle, it was decided to illustrate this image in a unique manner: from the center row of pockets 106 down, only the outer boundary line of the pocket is shown, for clarity; however, for accurate representation, the rows of pockets above the center line are shown with both their inner and outer boundary lines within the component layer.

In the pocket 106 shown in the center of the sphere, both the inner sphere pocket and the outer sphere pocket are visible, as indicated by the multiple concentric circles extending within the pocket 106. The sphere on sphere chassis system 100 also includes wiring 110 the wiring 110 represents the wiring that is in the front surface of the sound sphere chassis system, nearest to the viewer and shown in a solid line. The dashed lines represent the wiring which is within the far side of the sphere on sphere chassis system 100. Both of the inner sphere 102 and the outer sphere 104 may have wiring extending between their respective pockets 106. The wiring 110 typically electrically connects each pocket 106 to its four adjacent pockets.

Figure 1C:
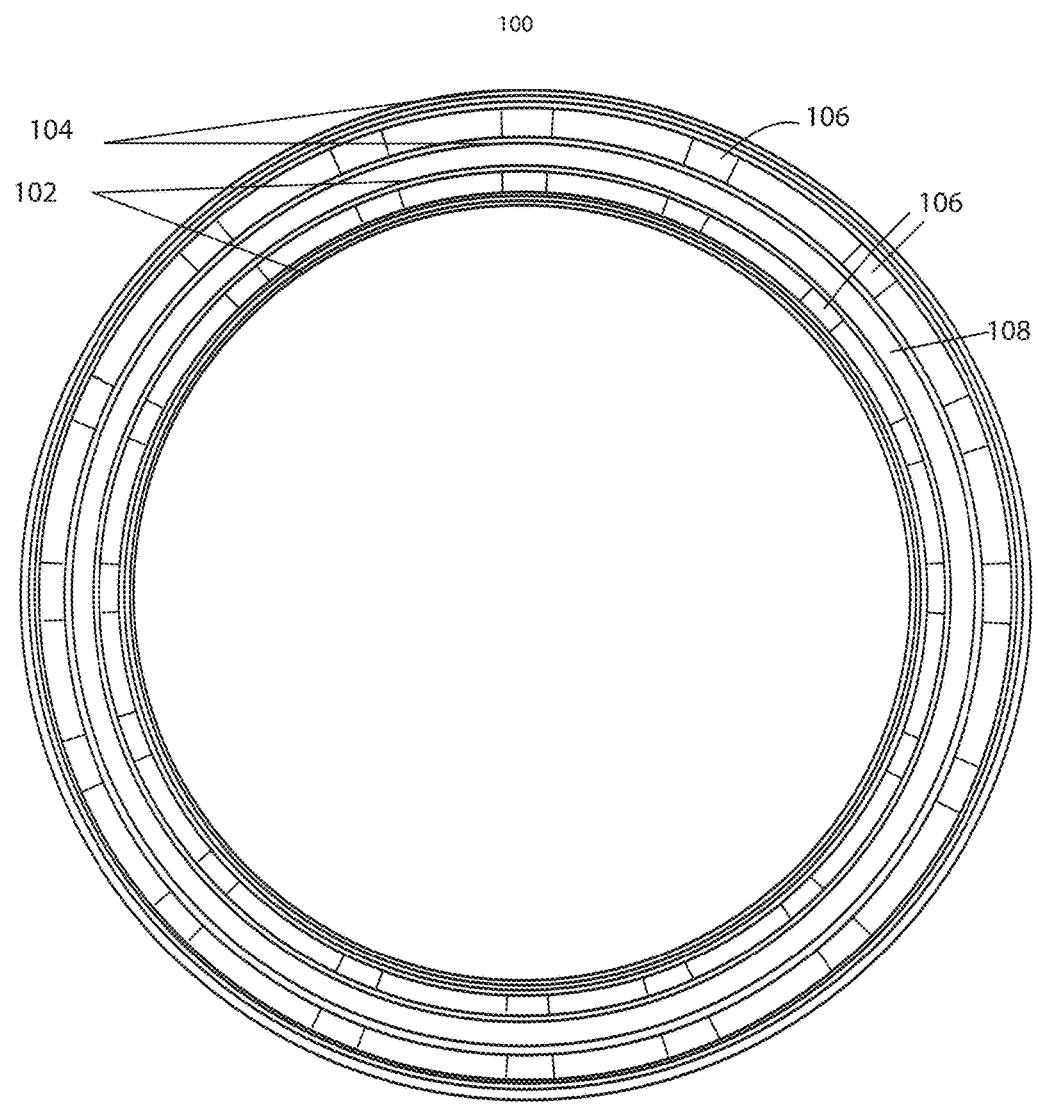
FIG. 1C is a cut away view of the sphere-on-sphere chassis system.

Turning now to FIG. 1C, another depiction of the sphere-on-sphere chassis system 100 is shown. In this example, we see a side view of a cross section that is taken of both spheres at their widest point. This illustrates one way in which the various pockets 106 formed in the inner sphere 102 and those pockets 106 formed in the outer sphere 104 are able to align with one another. As shown, the pockets 106 are bordered by edge lines that angle directly towards the center point of their respective sphere.

Figure 1D:
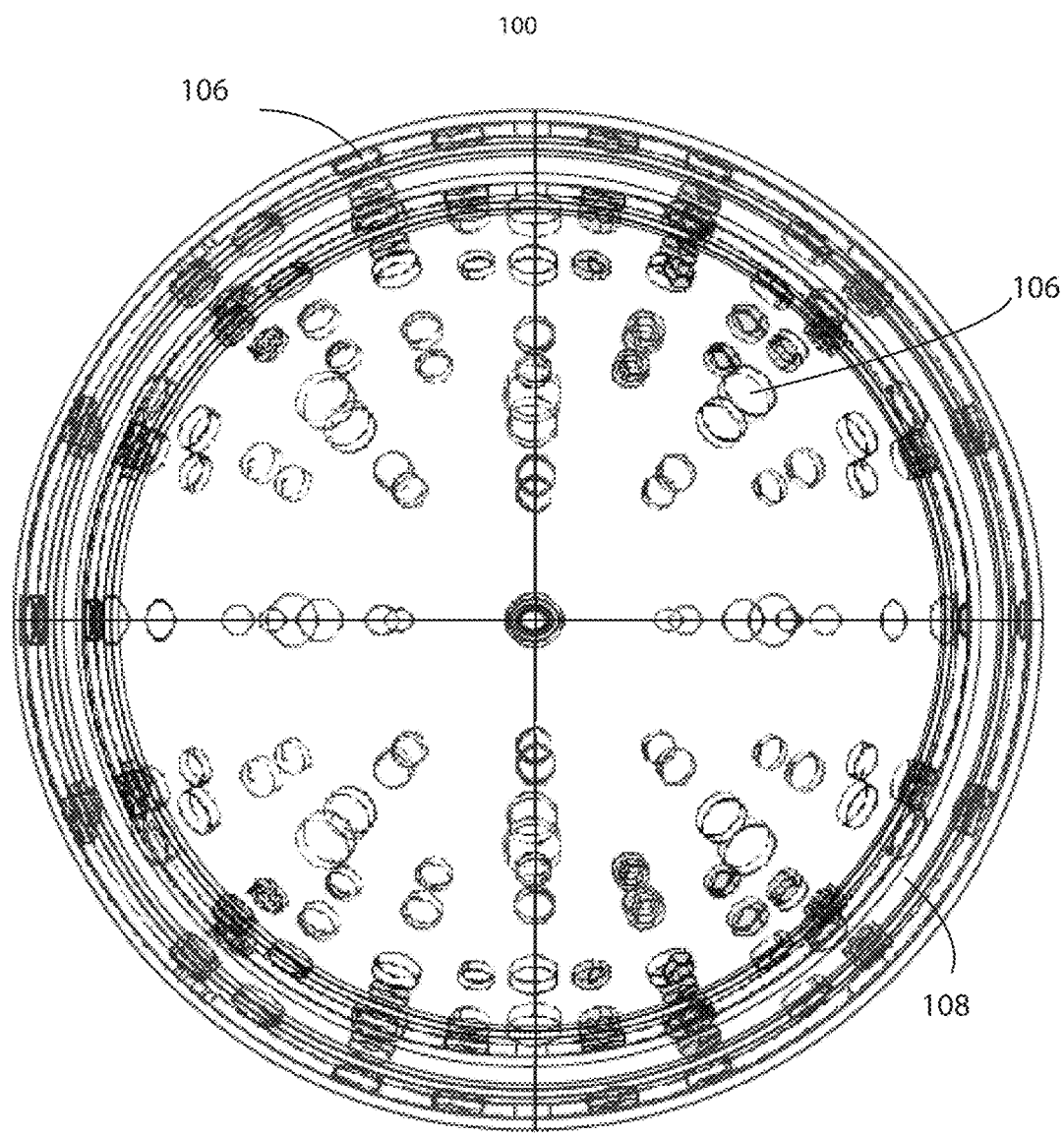
FIG. 1D is a more detailed view of the layering of a sphere-on-sphere chassis system according to one or more embodiments, where the wiring is not shown.

Turning now to FIG. 1D, a view of the sphere-on-sphere chassis system 100 is provided in another view, that now includes all layering of the inner sphere and the outer sphere, as well as pockets, but is not shown with wiring channels. In FIG. 1D, a straight vertical line, as well as a straight horizontal line can both be seen to cross through the center-point of the image. These lines illustrate the connection points of the eighth panels, which will be illustrated in more detail in FIGS. 5, 6A and 6B. One particularly interesting aspect of FIG. 1D is that it can be seen as a front view, back view, right view or left view. This is an intentional effect of uniquely designed geometric pattern.

Figure 2:
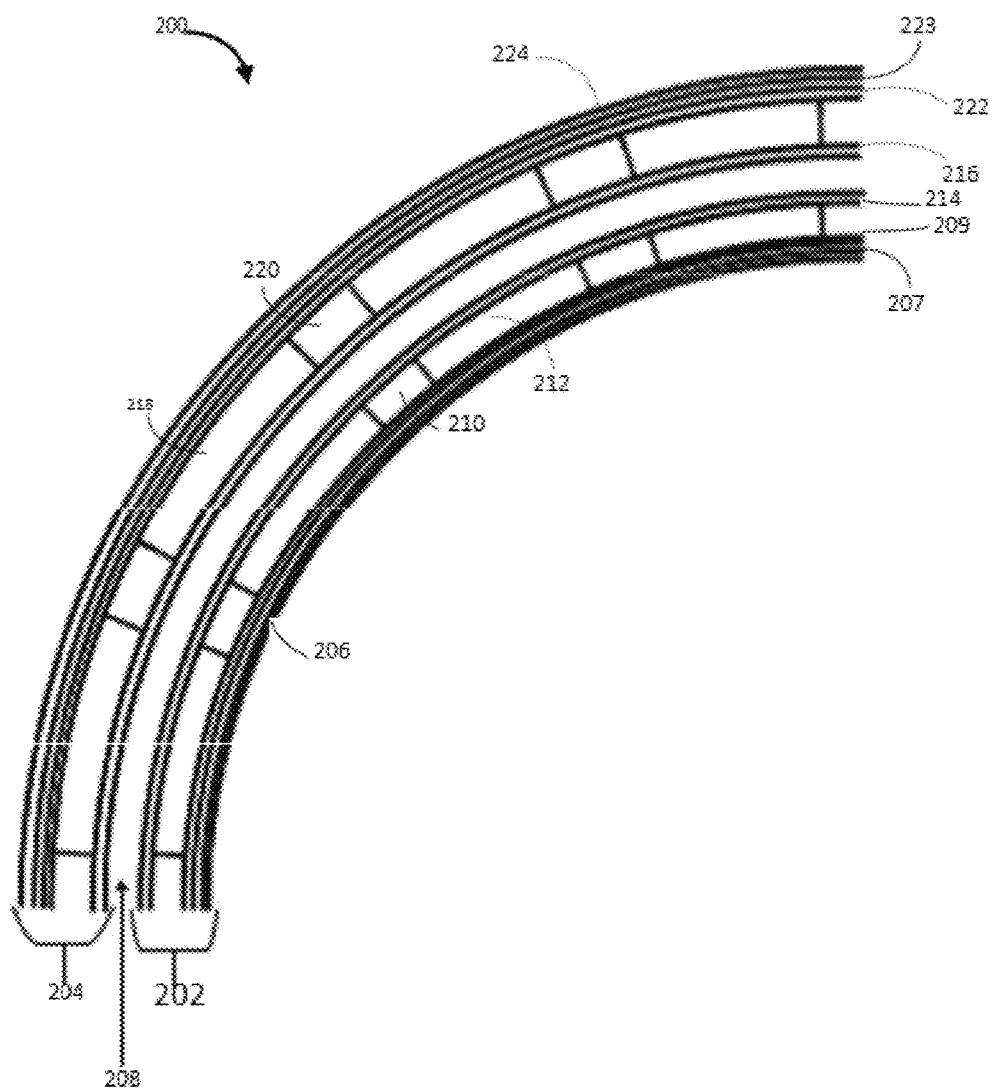
FIG. 2 is a cutaway view of an embodiment of a sphere-on-sphere chassis system showing various layers contained in and among the inner and outer spheres.

As noted above, the sphere on sphere chassis 100 is formed of an inner sphere 102, and outer sphere 104, and the hydro-layer 108 positioned between the two spheres. Each of the spheres may be formed of various different materials which allow it to provide the unique functionality made possible by the sphere on sphere chassis system. FIG. 2 is a cutaway view of a portion of an embodiment of a sphere-on-sphere chassis system showing a layering configuration 200 that may be contained in and among the inner and outer spheres according to one or more embodiments of the invention. The layering configuration 200, generally includes three major components. Those are the inner sphere section 202, the outer sphere section 204, and the hydro-layer section 208. As shown in FIG. 2 the inner sphere section 202 is a cutaway view of a segment of the inner sphere 102 from FIG. 1A. The outer sphere section 204 is a cutaway view of a segment of the outer sphere 104 from FIG. 1A. The hydro-layer section 208 is a cutaway view of a segment of the hydro-layer 108 from FIG. 1A.

The inner sphere section 202 includes various layers forming the inner sphere. Together, these layers may be 3-7 inches thick. For example, the inner sphere may include a first structural layer 206. This inner surface layer is typically made of acrylic laminate, or some other material which is transparent, rigid, and smooth. In some embodiments, the structural layer 206 may have a glass-like feel. Because the first structural layer 206 is transparent, from the inside of the sphere on sphere chassis system 100, it is possible to see through the structural layer 206 to a screen housing layer 207. The screen housing layer 207 is generally comprised of an empty space, filled only with structural supports (not shown) that run between structural layer 207 and structural layer 209, in which a series of electronic displays, such as curved transparent OLED displays, for example, can be placed between the structural supports and between layers 207 and 209. While projection screens can be used, the most desirable screen technology would likely be a type of curved transparent OLED screens, which may become transparent when not in use. Thus, when the sphere on sphere chassis system 100 is used as a virtual reality device, the screen housing layer 207 may be used to create a visual display in every direction of the virtual reality environment shown to the person within this sphere on sphere chassis system 100. The pattern for where the structural ridges are placed within the screen housing layer may be changed depending on many variables, such as screen size and shape. What is important to note is that the ridges should be strong, transparent and thin, in order to allow the most possible surface area for screens within the screen housing layer 207.

Proceeding outwardly from the screen housing layer 207, a second structural layer 209 is provided. Thus, the screen housing layer is surrounded by the first structural layer 206 and the second structural layer 209. The second structural layer may be formed of substantially the same materials as the first structural layer 206. Alternatively, the second structural layer 209 may be formed of different materials than the first structural layer 206. Although the second structural layer 209 may be formed of different materials, it generally may maintain the same properties as the first structural layer 206. That is, it may be transparent, rigid, smooth, and glass-like to the touch.

Proceeding outwardly from the second structural layer of the inner sphere section 202 is another layer having different sections, which is hereby called the component layer 212. In particular, the area immediately outside the second structural layer 209 includes a component layer 212 which has several pockets 210 dispersed through it which correspond to the pockets 106 shown in FIG. 1A. The component layer 212 may take the form of a transparent, material with considerable density and strength, such as polycarbonate or transparent aluminum. The component layer 212, because it is formed to house the majority of the spherical device's components and electronics which are necessary for operation, may be manufactured with additional pockets over time. In addition, in some embodiments, the component layer 212 may be configured in width according to the size of the largest components. For example, if the electromagnets are the largest component, and the need to extend 4 inches in length from the inside of the component layer to the outside, you may decide based on this information that the component layer must be at least 4 inches in thickness. This component layer allows for additional electronics, such as sensors, microchips, and wiring channels to be placed within additional pockets (not shown) or grooves (not shown) that can be added in the future. As mentioned above, the pockets 210 are generally, but not exclusively, used as a housing for electromagnetic components, and resonant inductive components. The electromagnetic components, which are discussed in additional detail below, are generally positioned within the pockets 210 so that each may create electromagnetic fields which can combine in various patterns to create motion in the sphere-on-sphere chassis system 100.

Proceeding outwardly from the component layer 212, the next layer in the inner sphere section 202 is the third structural layer 214. The third structural layer 214 serves as the outermost layer of the inner sphere section 202, creating the outer boundary of the inner sphere 102 in the sphere-on-sphere chassis system 100. As with the other structural layers, the structural layer 214 generally is transparent, rigid, and smooth, and may be made of materials similar to the inner more structural layers 206 and 209. Thus, the third structural layer 214 also serves as the innermost boundary of the hydro-layer section 208. As noted above, the hydro-layer section 208 is the same as the hydro-layer marked 108, and is a sealed spherical channel, or space between the spheres. In some embodiments, as previously mentioned, the hydro-layer may be section 208 may either contain a vacuum, a gas, a liquid, or a combination of gas and liquid to create the hydro-layer 108 (also shown as 208). Also previously noted, the hydro-layer 108 may be used to create buoyancy between the inner sphere 102 and the outer sphere 104.

Moving outward from the hydro-layer section 208, the outer boundary of the hydro-layer section 208 forms the beginning of the outer sphere section 204. The outer sphere section may typically be around 6 inches thick, although other sizes and thicknesses may be used in accordance with some embodiments. Sealing the hydro-layer section from the outer sphere section 204 is a fourth structural layer 216. The fourth structural layer 216 typically has the same properties as the other structural layers, and in particular is normally transparent, rigid, smooth, and strong. The outer side of the fourth structural layer 216 forms the inner surface for the second component layer 218 and the pockets 220 that are part of the outer sphere section 204. The second component layer 218 generally has the same properties as the first component layer 212. Namely, it is a transparent, resilient material, such as polycarbonate or transparent aluminum, which can be shaped with pockets and grooves for components as needed. As the as was the case with the first component layer 212, the second component layer 218 can be modified by removing portions of the component layer's material in order to create additional pockets, grooves and channels which may house additional electrical and electromagnetic components for the device.

Bordering the second component layer 218 and the pockets 220 is the fifth structural layer 222. The fifth structural layer 222 may generally have the same properties as each of the other structural layers. Proceeding outward from the fifth structural layer 222, the next layer is a second screen housing layer 223. The second screen housing layer 223 is generally similar to the first screen housing layer 209. However, it is not intended for viewing from the inside of the sphere as is the case with the first screen housing layer. Rather, the second screen housing layer 223 is intended to be viewed from outside the sphere-on-sphere chassis system 100. Thus, the collection of screens in the screen housing layer 223 may be configured to face outwardly from the sphere on sphere chassis system 100. The screens making up the second screen housing layer 223 may be used to change the outward appearance of the sphere on sphere chassis system 100. It is to be appreciated that the screen housing layers 207 and 223 are typically used in embodiments in which the sphere on sphere chassis system 100 is used to carry an operator or passenger. In some applications for the sphere-on-sphere chassis, such as a version that is not used for an operator or passenger, the screen housing layers 207 and 223 may be omitted, along with one or more corresponding acrylic laminate layers. For example, if you have no need in a certain embodiment for an inner screen housing layer, than it is possible to remove the structural layer that lies inwardly of the inner screen housing layer, as well as the structural ridges which would lie between the screen housing layer's screen panels. In another example, if you are using the device for an application in which there is no need for an outward facing, outer sphere screen housing layer, then you may remove that screen housing layer, along with its outer more structural layer and the structural ridges that run throughout that corresponding screen housing layer. In both examples, removing the layers as explained would still leave you with a smooth, rigid inner sphere structural layer, as well as a smooth, rigid outer sphere structural layer.

Proceeding outwardly from the second screen housing layer 223, the next layer is the sixth structural layer 224. This is structural layer generally forms the outermost layer of the outer sphere section 204. Because this layer is the outermost layer of the sphere on sphere chassis system 100, it may be a thicker and/or stronger structural layer than other structural layers present in more interior layers. However, like each of the other structural layers, the sixth structural layer 224 is transparent so that the second screen housing layer 223, having the outward facing screens or displays enclosed therein, can be seen from outside of the sphere-on-sphere chassis system 100. Moreover, in some embodiments, the sixth structural layer 224 may allow for various items to be attached to the outside of the outer sphere of the sphere-on-sphere chassis system 100, such as additional layers, tinting materials, or items that are magnetically or pneumatically sealed to the curved, spherical outer surface. Although a specific layering configuration is provided in FIG. 2, it is to be appreciated that additional layers may be used to provide additional functionality and/or benefits. For example, additional coating layers may be applied to the chassis system 100 to modify its appearance and/or functionalities. These may include a tire coat, a tint coat, protective coating(s), or some other type of additional material layering. It is to be further appreciated that the screen housing layers 207 and 223 are not necessary for the functionality of the sphere-on-sphere chassis system in every embodiment and may be implemented (or not implemented) according to functional needs and human interfacing requirements.

Figure 3:
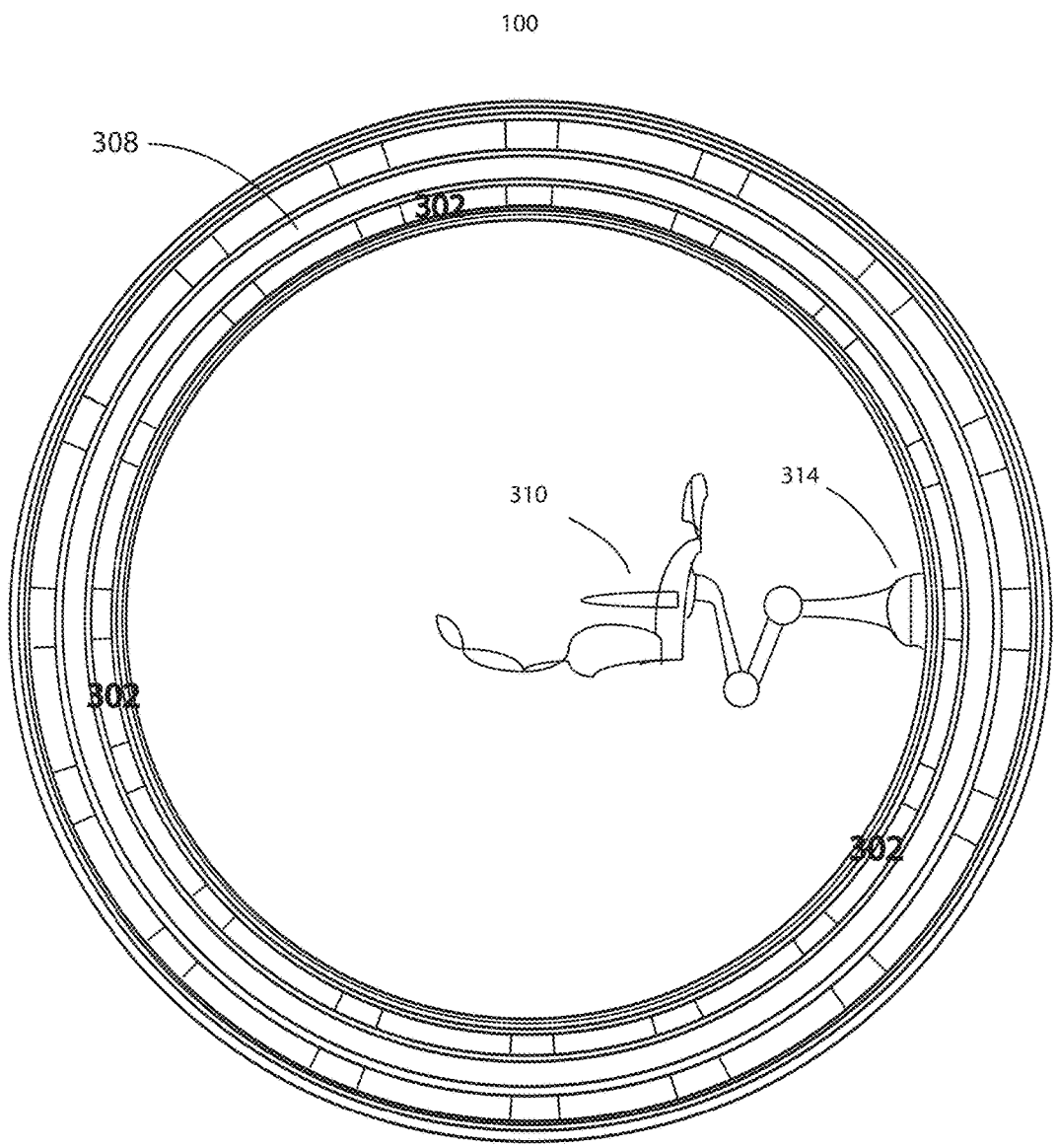
FIG. 3 is an illustration of a spherical device configured to accommodate the seating of a passenger and/or operator within the inner sphere.

As mentioned previously, in some embodiments, a sphere-on-sphere chassis system such as the system described in FIG. 1 and two above, above, may be utilized as a transportation vehicle or a virtual-reality room for a person (or persons) seated and/or standing within the inner sphere 102 of the device 100. FIG. 3 is an illustration of a spherical device configured to accommodate the seating of a passenger and/or operator within the inner sphere. It is important to note that in FIG. 3, the scale of the chair is not the important thing to note, since the spherical device itself has been stated as being scalable. What is important to note about FIG. 3 is that it illustrates that an item, or items, may be attached to a surface of a sphere. This can occur through methods such as, but not limited to: electromagnetic attraction, or pneumatic locking (air locking/vacuum sealing), of the item to the sphere's surface. This item attachment feature can occur on the inner most surface of the inner sphere, or the outermost surface of the outer sphere (not shown) in many embodiments.

As shown in FIG. 3, a sphere-on-sphere chassis system 300 includes an inner sphere 302 and an outer sphere 304. Positioned between the inner sphere 302 and the outer sphere through four is a hydro-layer 308. The within the hollow sphere 302 a passenger seat 310 may be positioned. The passenger seat 310 may be attached to the innermost layer of the inner sphere 302 using an attachment 314 and a mechanical arm. The attachment 314, as previously mentioned, may take various forms, including electromagnetic attraction, adhesives, mechanical fasteners, pneumatic/air locking mechanisms and the like. As shown in FIG. 3, the passenger seat 310 may be configured for a passenger to sit on, while operating the sphere on sphere chassis system 300.

Figure 4A:
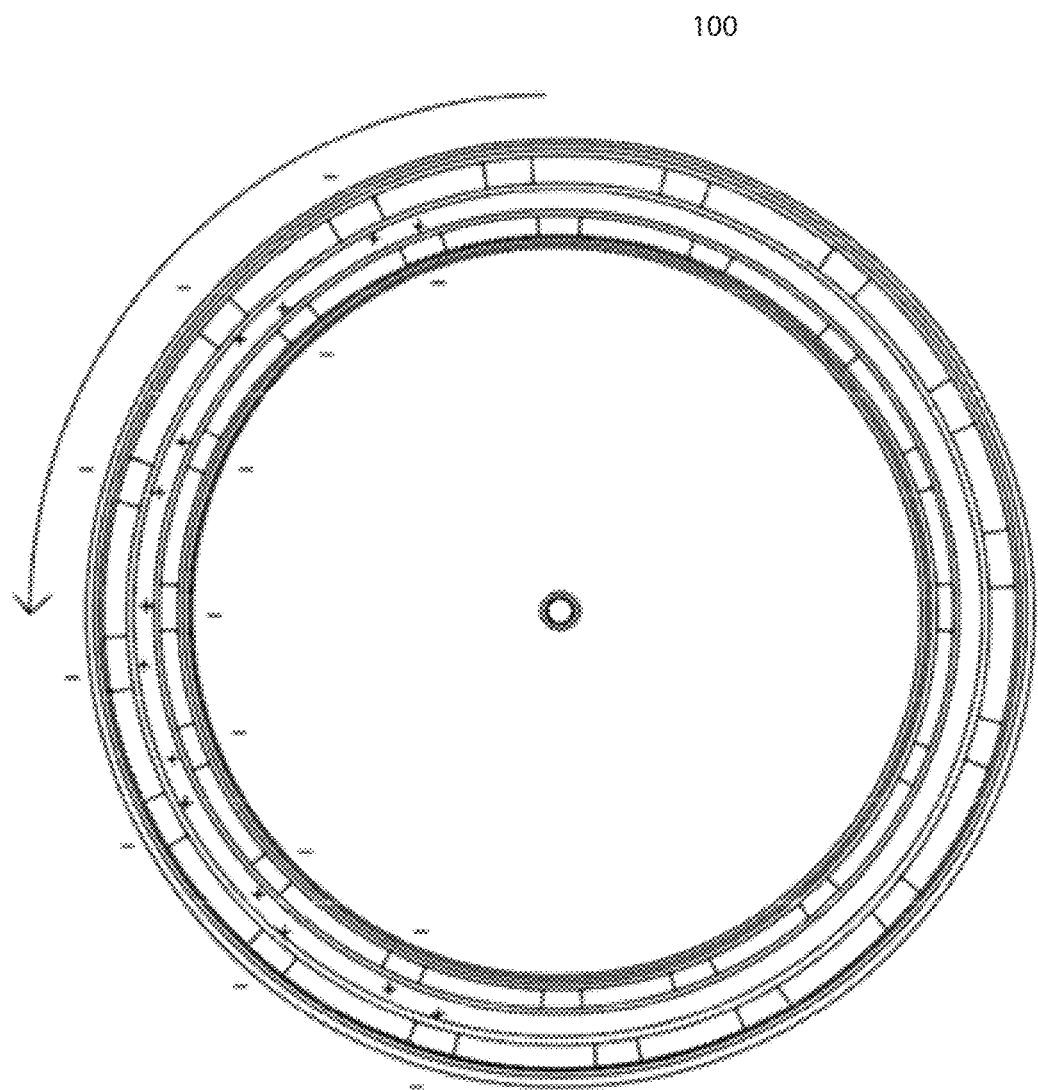
FIGS. 4A-4B provide an illustration of how some of the relative movement between the spheres can be generated according to one or more embodiments.
Figure 4B:
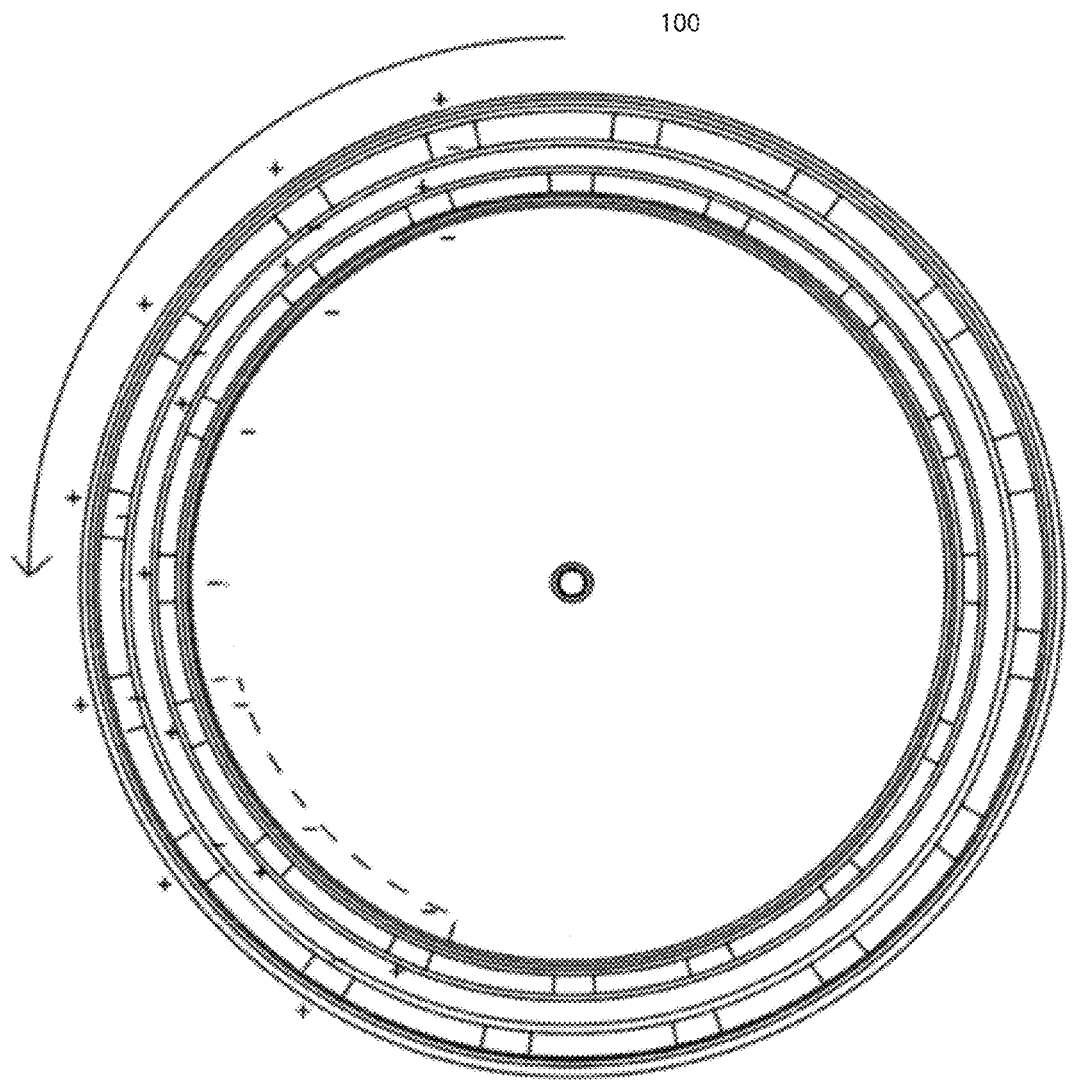

When the sphere-on-sphere chassis 300 shown in FIG. 3 is operated by a person, it may be configured to create movement by the outer sphere 304 while causing relatively little motion within the inner sphere. FIG. 4A provides one example of how some of this relative and independent movement between the inner sphere 302 and the outer sphere 304 may be generated. As noted previously, each of the inner sphere 302 and the outer sphere 304 may have a series of symmetrical pockets located throughout the component layers in each respective sphere. These pockets serve as housings for the components previously mentioned, (electromagnets and resonant inductive components) but may include other components as needed for some embodiments. The electromagnets in each pocket are designed to emit positive and negative electromagnetic waves inwardly and outwardly of their pocket, with respect to the center of each sphere. They operate in conjunction with resonant inductive chargers and resonant inductive receivers to transmit electrical current through the walls of each sphere. The electromagnetic waves generated by each electromagnet may cause movement as shown in FIGS. 4A and 4B.

Figure 5:
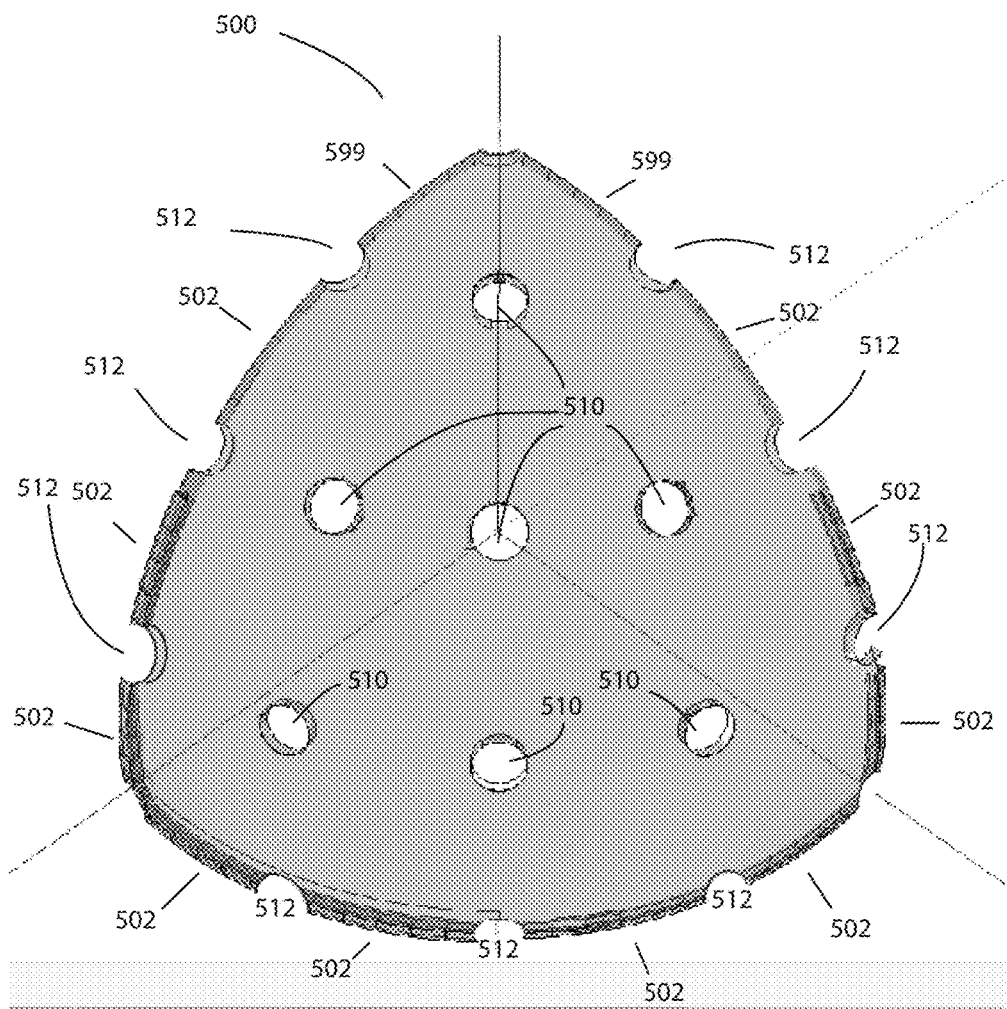
FIG. 5 is an illustration of an eighth panel for a component layer.
Figure 6A:
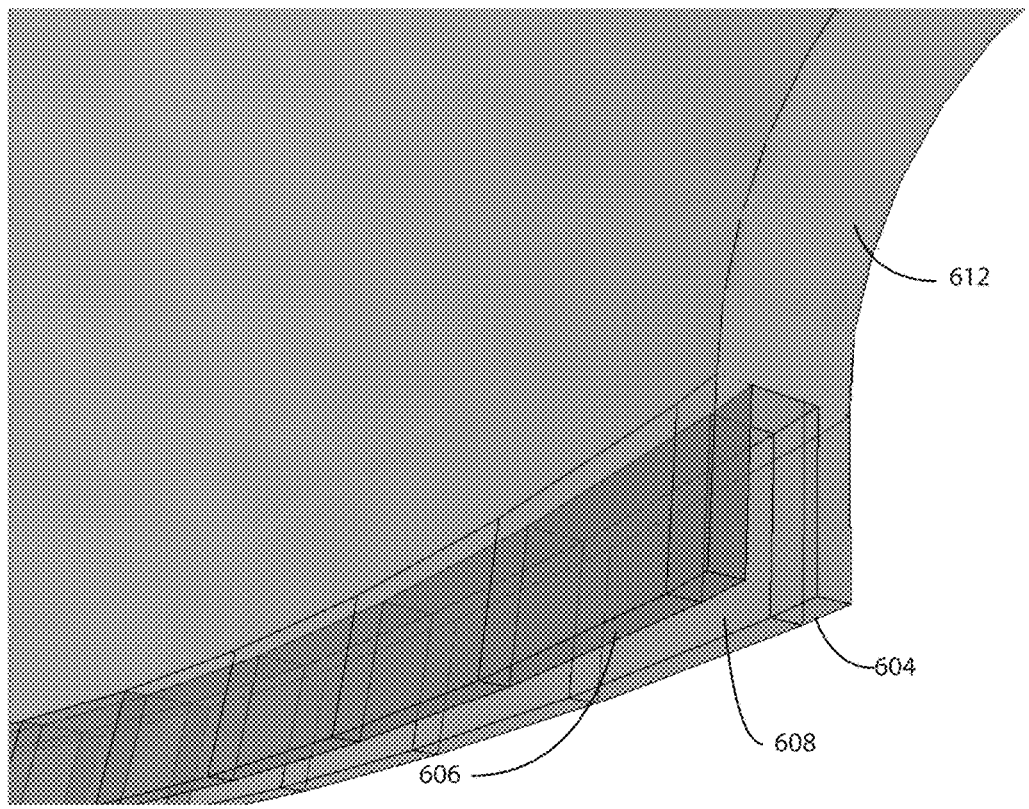
FIGS. 6A-6B provide illustrations of some of the eighth panels connection points which each layer of the sphere-on-sphere chassis can contain according to one or more embodiments disclosed herein.
Figure 6B:
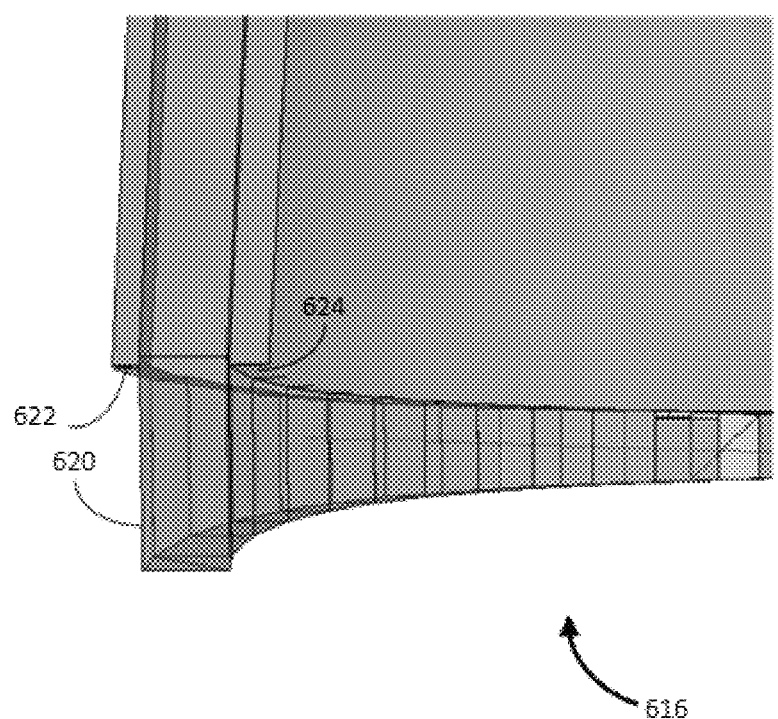

The sphere-on-sphere chassis system disclosed in this application may be constructed and assembled in various ways. FIGS. 5, 6A and 6B provide examples of how a sphere-on-sphere chassis system's layers may be assembled according to one embodiment. In this embodiment, the sphere-on-sphere chassis system's layers are assembled by the connection of eight symmetrical segments, hereby called an eighth panel. FIG. 5 provides an example of one of the eighth panels for use in one of the component layers. This component layer's eighth panel 500, may be connected to seven other eighth panels 500 to form the component layer wall(s) of the sphere-on-sphere chassis system such as, for example, sphere on sphere chassis system 100 discussed above. As shown, the eighth panel 500 has the necessary rounded shape, with the pockets 510 formed inside of the perimeter 502 of the eighth panel 500. In addition, several pockets 512 are partially defined within the perimeter 502, and when the eighth panel 500 is coupled to one or more neighboring eighth panels 500, the pocket 512 becomes a fully defined pocket. In this FIG. 5, the pockets are shown to already have been carved/taken out of the component layer's eighth panel 500, to illustrate the pattern of pockets. However, the wiring channels are not shown.

As noted above, coupling eight of the eighth panel 500 together results in the formation of a complete sphere-on-sphere chassis system. Some perimeter edges may not be male or female, and instead may be flat 599. Turning now to FIGS. 6A and 6B, male and female attachment portions for attaching two or more eighth panels, such as component layer eighth panel 500, are shown. With specific reference to FIG. 6A, a more detailed view of the perimeter 502 is shown. These male and female attachments may be used to aid in securely attaching additional component layer eighth panels 500, in order to form what results in a complete hollow sphere layer. FIG. 6A is to be understood to show a female connection type edge which is on the side of a component layer eighth panel 500, however the male and female type edges can be used in structural layers as well (see below FIG. 6B). This female connection type edge includes an outer female connection edge 604 and an inner female connection edge 606. Between the inner edge 606 and the outer edge 604 is a channel 608 which is configured to receive a corresponding male connection type edge from a neighboring eighth panel 500.

Turning now to FIG. 6B, a corresponding perimeter 616 of an eighth panel includes a male connection type edge 620 which may be received into the gap 608 formed in the female connection type edge of the perimeter 602 shown in FIG. 6B. The male connection type edge 620 extends from the body of the hemisphere part, with an outer receiving wall 622 configured to receive the outer edge 604, and an inner receiving wall 624 configured to receive the corresponding inner edge 606. Thus, when attachment edges like those in FIGS. 6A and 6B are joined, they may better form a secure, airtight, rigid connection.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A sphere-on-sphere chassis system, comprising:
a first hollow sphere having a first diameter;
a second hollow sphere positioned inside of the first sphere to form a channel therebetween, the second hollow sphere having a second diameter, wherein the second diameter is less than the first diameter;
wherein each of the first hollow sphere and the second hollow sphere contains a component layer, comprising:
a symmetrical series of pockets for housing components such as electromagnets, resonant inductive chargers and resonant inductive receivers, wherein:
the electromagnets may be configured to emit positive and negative electromagnetic waves inwardly and outwardly of each pocket with respect to the center of each sphere;
and the resonant inductive chargers and receivers may work to transmit and receive electrical current inwards and outwards through the walls of each of the spheres;
wherein the first hollow sphere and the second hollow sphere are configured to move independently of each other based on electromagnetic waves generated by the electromagnets
the channel between the two spheres can be comprised of a gas and/or a liquid, or it may also be used with neither for the formation of a vacuum in channel,
wherein walls of the first hollow sphere and the second hollow sphere are made of materials which are substantially transparent.

2. The sphere-on-sphere chassis system of claim 1, wherein the component layer includes areas within the component layer directly between the pockets that can be built to house components that are sensitive to electromagnetic waves, such as certain micro-electronics, screen cards, batteries, cameras, sensors and ultrasonic energy transmission devices.

3. The sphere-on-sphere chassis system of claim 2, wherein the inner and outer layers of both sphere walls are built to be rigid, watertight, airtight, resistant to shattering and as near to the smooth shape of a perfect sphere as is possible to manufacture.

4. The sphere-on-sphere chassis system of claim 3, wherein the component layer of each sphere is located between outer more structural layers, and allows for the manufacturing of grooves, channels and pockets for wires that can link components together in the component layer, as well as wires that can run into the outer more structural layers.

5. The sphere-on-sphere chassis system of claim 4, wherein an inner layer of the second hollow sphere includes an area for a plurality of curved displays, wherein the curved displays substantially conform to the shape of the inner wall of the second hollow sphere, wherein they are protected from impact from an inner more rigid, transparent structural layer and internal structural supports that connect it to the outer more structural layer.

6. The sphere-on-sphere chassis system of claim 5, wherein an outer layer of the first hollow sphere includes an area for a plurality of curved displays, wherein the curved displays substantially conform to the shape of the outer wall of the first hollow sphere; wherein they are protected from impact from an outer more rigid, transparent structural layer and internal structural supports that connect it to an inner more structural layer.

7. The sphere-on-sphere chassis system of claim 6, wherein the spheres' layers can be manufactured in segments, such as half panels, quarter panels, eighth panels or smaller, so long as they connect together at the edges to form a complete spherical layer.

8. The sphere-on-sphere chassis system of claim 7, wherein the entire spherical device may he scalable to a degree, and may, in some configurations, be built without screens, screen housing layers and/or the inner most inner sphere layer and outer most outer sphere layer.

9. The sphere-on-sphere chassis system of claim 8, wherein both the first hollow sphere and second hollow sphere are not only patterned with pockets that are identical to equal sized sections on the opposite side, when aligned with each other and with respect to the center of the sphere, but that they are also as near as possible to the same weight as their corresponding opposite side.

\* \* \* \* \*